Oct. 19, 1965 H. R. GREENE 3,213,297
MONOSTABLE MULTIVIBRATOR HAVING TIME CONTROL CIRCUITRY ISOLATED FROM INPUT
Filed April 30, 1963
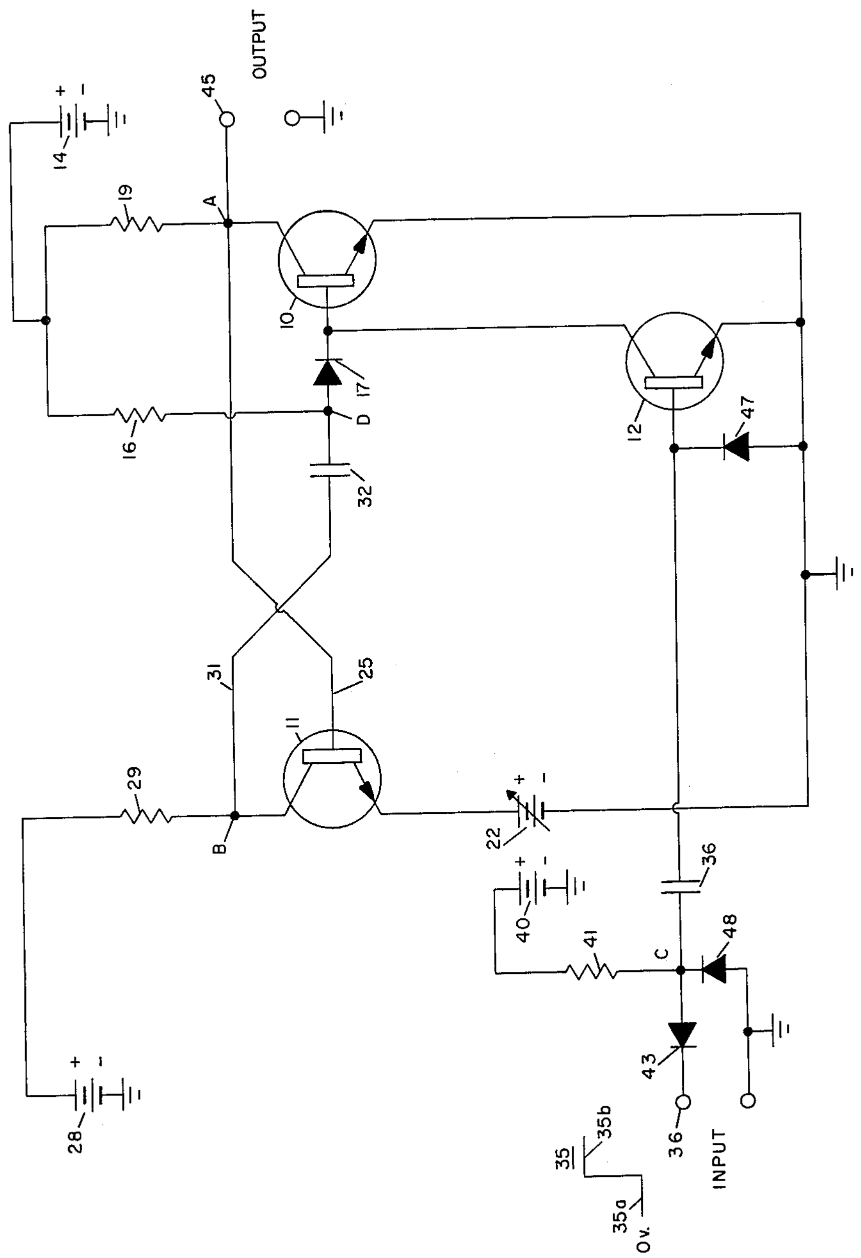
*INVENTOR.*
HAROLD R. GREENE
*BY*
Allan Ratner
ATTORNEY United States Patent Office 3,213,297 Patented Oct. 19, 1965

3,213,297

MONOSTABLE MULTIVIBRATOR HAVING TIME CONTROL CIRCUITRY ISOLATED FROM INPUT

Harold R. Greene, New Shrewsbury, N.J., assignor to Electronic Associates Inc., Long Branch, N.J., a corporation of New Jersey Filed Apr. 30, 1963, Ser. No. 276,768
4 Claims. (Cl. 307—88.5)

This invention relates to multivibrator circuits and has for an object the provision of a monostable multivibrator having an output pulse width which is accurately controlled.

Monostable multivibrators of the type having one normally stable state and one quasi-stable state have been used to obtain an output pulse of predetermined width. In a typical one of these circuits, the time duration of the pulse is determined by the time duration that the multivibrator remains in its quasi-stable state. An input trigger signal induces transition from the stable state to the quasi-stable state in which state the multivibrator remains for a time delay period. It then returns to its stable state with no external signal being required.

In at least some of the prior circuits, the time delay period or time of the quasi-stable state is a function of the discharge time of the A.-C. coupling feedback components. However, the time constant of these components is subject to undesirable change when variations occur in the input trigger circuit. For example, as the time duration of the input trigger pulse varies, the impedance of the input circuit will vary correspondingly to result in a varying time constant of the A.-C. coupling components.

Accordingly, an object of the present invention is a monostable multivibrator having the time duration of its quasi-stable state maintained independent of changes in the operation of an input trigger circuit.

Another object of the present invention is a monostable multivibrator having an output pulse of pulse width which is independent of the time duration of an input trigger signal.

In accordance with the present invention, there is provided a monostable multivibrator including a unidirectional device for effectively isolating the input trigger circuit from the A.-C. coupling components during the time of the quasi-stable state. In carrying out the present invention in one form thereof, a pair of transistors are cross connected and arranged to provide a stable state when a first transistor of the pair is normally conductive and a second transistor of the pair is normally non-conductive, and to provide a quasi-stable state when the conductivity states of the transistors are reversed. One of the cross connections includes a coupling capacitor in series circuit relation with a normally conductive unidirectional device. The input trigger circuit for the monostable multivibrator is connected to the device on the side remote from the capacitor.

Upon application of an input trigger pulse, the multivibrator is switched to its quasi-stable state, the unidirectional device is rendered non-conductive and the coupling capacitor begins to discharge. With the device non-conductive, the input circuit is effectively isolated from the A.C. coupling components so that the discharge circuit operates independently of the input circuit. The coupling capacitor discharges until the unidirectional device and the first transistor are rendered conductive to return the multivibrator to its stable state.

In a preferred form of the invention, an output of the first transistor is directly connected to one input of the second transistor, and an adjustable source of D.-C. potential is applied to another input of the second transistor. Accordingly, during the time of the quasi-stable state, the amplitude of the output voltage pulse appearing at the output of the first transistor may be adjusted to a predetermined value by changing the setting of the adjustable source. The output pulse voltage after being thus set remains constant for all values of output current.

For a more detailed disclosure of the invention and for further objects and advantages thereof, references is to be had to the following description taken in conjunction with the single figure of the accompanying drawing which schematically illustrates a monostable multivibrator embodying the invention.

Referring to the drawing, the invention in one form has been shown as comprising two switching transistors 10 and 11 of the NPN type and a trigger transistor 12 also of the NPN type. In the stable state of the multivibrator, the transistor 10 is normally conductive and the transistor 11 is maintained normally non-conductive. Transistor 10 is maintained normally conductive as a result of current flow through its emitter-base junction which is above a predetermined value. That current flows from the positive side of battery 14 through a resistor 16, a diode 17 through the base-emitter junction of transistor 10 to ground. The negative side of battery 14 is connected to ground. With transistor 10 conductive, there is provided a low impedance path from collector to emitter thereof so that a current flows from the positive side of battery 14 through resistor 19, point A, the collector, base and emitter of transistor 10 and then to ground. As a result of that low impedance path, the collector of transistor 10 (point A) is maintained at approximately ground potential.

The multivibrator being in its stable state, transistor 11 is maintained normally non-conductive by the application to its emitter of a positive bias relative to its base. That bias is provided by an adjustable D.-C. bias source schematically shown as an adjustable battery 22 connected between the emitter of transistor 11 and ground. The source 22 may be adjusted to provide a desired potential usually less than the potential of battery 28, which potential will be maintained constant for all values of current flow therethrough. Such adjustable sources are well known by those skilled in the art and may be of the types, as shown, for example, at page 13–26 et seq., Handbook of Semiconductor Electronics, edited by Lloyd P. Hunter, McGraw-Hill, 1956 and at page 308 et. seq., Electron Tube Circuits, by Samuel Seely, McGraw-Hill, 1950. The base of transistor 11 is effectively connected to ground by way of cross connection 25, point A, and conductive transistor 10 to ground. With ground potential applied to the base of transistor 11 and a positive potential applied to the emitter thereof, transistor 11 is maintained non-conductive.

With transistor 11 non-conductive during the stable state, there is provided a very high impedance between its collector (point B) and its emitter. Thus, a charging circuit for a coupling capacitor 32 may be traced from the positive side of battery 28 through resistor 29, point B, cross connection 31, capacitor 32, normally conductive diode 17, the base-emitter junction of conductive transistor 10 and then to ground. The negative side of battery 28 is connected to ground. Assuming that the multivibrator has been in its stable state for the time required for the capacitor 32 to be charged to its steady-state value, it will be understood that its left-hand plate will be charged positive and its right-hand plate negative with a potential therebetween approximately equal to the potential of the battery 28.

During the time of the stable state, the input signal 35 applied to input terminal 36 may be at zero potential 35*a* with respect to ground. In this case during steady-state conditions, (1) point C is at ground potential, (2) capacitor 36 is discharged and (3) the base of transistor 12 is at ground potential maintaining that transistor normally non-conductive. Accordingly, in the stable state with trigger transistor 12 non-conductive, there is provided a very high impedance between its collector and its emitter, and thus, this transistor as well as the input trigger circuit has no effect upon the charging circuit for coupling capacitor 32.

There has now been described the various currents and potentials of the multivibrator during the stable state. When the monostable multivibrator is to be switched or changed from its stable to its quasi-stable state, the positive-going step 35*b* of the trigger signal 35 is applied to the input terminal 36. Accordingly, the diode 43 is rendered nonconductive and this abrupt change produces a positive-going pulse which is applied by way of capaictor 36 to the base of transistor 12 rendering that transistor conductive. With transistor 12 conductive, there is provided a low impedance path from collector to emitter thereof so that the base of transistor 10 is effectively brought to approximately ground potential to cause transistor 10 to be rendered nonconductive. As transistor 10 is rendered nonconductive, the potential at point A rises in a positive-going direction from ground potential. This abrupt change of potential is applied as a positive-going step by way of the direct or "hard" cross-connection 25 to the base of transistor 11. Thus, current which previously flowed through transistor 10 now flows by way of cross-connection 25 through the emitter-base junction of transistor 11, rendering that transistor conductive. With transistor 11 rendered conductive and transistor 10 rendered nonconductive, the multivibrator has been switched to its quasi-stable state.

Further, with transistor 11 conductive there is provided a low impedance path from collector to emitter thereof so that the potential at point B changes from approximately the positive potential of battery 28 to the lower positive potential of the bias supply 22. This abrupt change of potential in a negative-going direction results in the development of a switching pulse applied by way of cross-connection 31 and capacitor 32 to point D and to the diode 17. The resultant pulse as applied to that diode is of negative polarity with respect to ground causing diode 17 to become nonconductive. With diode 17 nonconductive, the input trigger transistor 12 is effectively isolated from point D and from the coupling capacitor 32 and in this manner the input circuit is effectively isolated from that capacitor's discharge circuit.

As above described, a pulse of negative polarity is applied to the diode 17 which renders it nonconductive and thus that pulse is prevented from being applied to the base of transistor 10. Such a negative polarity pulse of substantially high value if applied to the base of transistor 10 would provide a very high magnitude of reverse bias and have the effect of breaking down that transistor. Accordingly, the nonconductive diode 17 protects transistor 10 from such reverse bias.

With diode 17 non-conductive, the discharge circuit of the coupling capacitor 32 may be traced from the left-hand plate of capacitor 32, cross-connection 31, point B, conductive tranistor 11, battery 22, ground, battery 14, coupling resistor 16, point D and then to the right-hand plate of the capacitor. As previously described, point B is maintained at the relatively low positive potential of the bias source 22, and the potential at point D has decreased to a negative polarity with respace to ground. It will also be remembered that the capacitor 32 has previously been charged to approximately the potential of the battery 28. Accordingly, it will be understood that as capacitor 32 discharges, the point D from a negative potential rises in potential in a positive-going direction.

The potential at point D increases from its negative value until it reaches a positive value sufficient to render conductive both diode 17 and the emitter-base junction of transistor 10. At that time, transistor 10 is rendered conductive and the potential at point A decreases to approximately ground potential. This abrupt change in potential results in the development of a negative-going switching voltage step applied by way of the direct or "hard" cross-connection 25 to the base of transistor 11. In this manner, transistor 11 is rapidly rendered nonconductive which causes point B to rise in potential and provide current flow through the cross-connection 31 to initiate the charging of capacitor 32 and speed the full conduction of transistor 10. As capacitor 32 acquires charge, the potential at point B rises until a steady-state value is reached and the multivibrator may again be switched to its quasi-stable state in the manner described.

Accordingly, with transistor 10 rendered conductive and transistor 11 rendered nonconductive, the quasi-stable state has been terminated and the multivibrator has been returned to its stable state. As described and illustrated in detail in "Pulse and Digital Circuits," by Millman and Taub, McGraw-Hill, 1956, at page 174 et seq., the rate of discharge of the coupling capacitor 32 determines the time duration of the quasi-stable state and that time duration may be varied by varying the time constant of the discharge circuit. However, in accordance with the present invention, diode 17 is maintained nonconductive during the quasi-stable state and thus, any changes occurring in the input trigger circuit are isolated from and have no effect on the time constant of the discharge circuit. Accordingly, the output pulse produced at the output terminal 45 is of very accurate pulse width and independent of the input trigger circuit. Such control of the amplitude of the output voltage pulse is achieved by means of the adjustable voltage source 22. During the time duration of the output pulse, transistor 11 is conductive and there is a low impedance path from its emitter to its base and that base is connected by way of the direct cross-connection 25 to point A and output terminal 45. Thus, there is a low impedance path from adjustable source 22 to the output and the amplitude of the output voltage pulse is approximately equal to the potential provided by the source 22. Accordingly, the output pulse may be adjusted to a desired potential by changing the setting of the adjustable source 22 and this pulse voltage will remain constant for all values of output current. In this manner, the multivibrator of the present invention provides an output pulse of accurate pulse width with an accurately controlled pulse amplitude.

In addition, the direct cross-connection 25 provides a feedback path from the collector of transistor 10 to the base of transistor 11, which direct path does not attenuate the signals produced at point A as applied to the base of transistor 11. Accordingly, as a result of this direct cross-connection there is provided rapid turn "ON" and rapid turn "OFF" of transistor 11.

It will be remembered that during the quasi-stable state, upon application of the pulse 35*b*, the diode 43 has been rendered nonconductive and trigger transistor 12 has been rendered conductive. At that time, a charging circuit for capacitor 36 may be traced by way of the positive side of battery 40, resistor 41, point C, capacitor 36, the emitter-base junction of transistor 12, ground and to the negative side of battery 40. It will be assumed that the slope of the leading edge of the pulse 35 rises more rapidly than the slope of the voltage wave form produced across the charging capacitor 36. Accordingly, as the capacitor acquires a charge, the point C increases in potential from ground until diode 43 is rendered conductive. At that time point C is maintained at the potential of the pulse 35*c* and the emitter-base current of transistor 12 decreases to zero rendering that transistor nonconductive. It will now be seen that for input pulses of differing amplitudes diode 43 will be rendered conductive at differing times, which results in varying the conduction time of transistor 12. This variation in the conduction time of transistor 12 may also be produced if input trigger pulses of differing pulse widths were applied directly to the base of transistor 12. In addition, transistor 12 may have a variable conduction time and a variable turn "OFF" time, depending on the particular variables of a given transistor. However, in accordance with the present invention, during the time of the quasi-stable state, any variation in the conduction time of the input transistor 12 has no effect on the time constant of the discharge circuit of capacitor 32 since nonconductive diode 17 effectively isolates the discharge circuit from the input circuit .

It will be understood that the values of the components of the charging circuit for capacitor 36 are selected to provide a conduction time for transistor 12 which is sufficiently long for triggering the multivibrator but shorter than the time duration of the output pulse. At the termination of the input pulse, there is provided a discharge circuit for capacitor 36 which may be traced by way of its left-hand plate, diode 43, the input pulse applying circuit, ground, diode 47 and to the right-hand plate. It is to be noted that a diode 48 is connected between point C and ground to shunt noise voltages which may be applied to the input terminal 36.

It is to be understood that transistors 10 and 11 may be of the PNP type with corresponding reversal of the polarity of the batteries 14, 22 and 28 and corresponding reversal of connections of diode 17. In addition, trigger transistor 12 may be of the PNP type with corresponding reversal of connections of diodes 43, 47 and 48, corresponding reversal of battery 40 and corresponding reversal of the polarity of the input pulse. The resistors 16, 19, 29 and 41, the capacitors 32 and 36 and the voltages of the batteries 14, 22, 28 and 40 will be selected to suit the requirements of the particular transistors used. For the example illustrated in the drawing, these components may have the following values:

| | | |
|---|---|---|
| Resistor **16** | ohms | 2,200 |
| Resistor **19** | do | 1,000 |
| Resistor **29** | do | 470 |
| Resistor **41** | do | 2,700 |
| Capacitor **32** | microfarads | 22 |
| Capacitor **36** | do | 12 |
| Battery **14** | volts | 12 |
| Battery **22** | volts maximum | 5 |
| Battery **28** | volts | 12 |
| Battery **40** | do | 12 |

Now that the principles of the invention have been explained, it is to be understood that many modifications may be made all within the scope of the following claims.

What is claimed is:

1. A monostable multivibrator having a pair of transistors cross-connected by a pair of cross-connections and arranged to provide a stable state when a first of said pair of transistors is conductive and a second of said pair is nonconductive, and to provide a quasi-stable state when said second transistor is conductive and said first transistor is nonconductive comprising, an input trigger circuit including a third transistor having a first terminal connected to one of said cross-connections at a junction and a second terminal connected to a source of reference potential for applying substantially said reference potential to said junction when said third transistor is rendered conductive, means for applying switching pulses to an input terminal of said third transistor for changing the conductivity state of said third transistor for switching said multivibrator from its stable state to its quasi-stable state, said cross-connection with said junction including a coupling capacitor which is charged during the time said multivibrator is in its stable state, a unidirectional device connected in said one cross-connection and between said capacitor and said junction and having a forward conduction direction the same as the base current direction of said first transistor, means for maintaining said device normally conductive during said stable state and for rendering said device nonconductive upon switching of said multivibrator to its quasi-stable state and for maintaining said device nonconductive during said quasi-stable state regardless of said input signals changing the conductivity of said third transistor, means for providing a discharge circuit for said capacitor for discharging it during the time said multivibrator is in its quasi-stable state, said capacitor after discharging a predetermined amount of charge providing a potential for rendering conductive said device and said first transistor to return said multivibrator to its stable state whereby during the entire time duration of said quasi-stable state said input circuit is effectively isolated from said discharge circuit to provide an output pulse having an accurate pulse duration independent of changes in operation of said input circuit.

2. The monostable multivibrator of claim 1 in which said unidirectional device comprises a diode one end of which is connected to an input terminal of said first transistor and the other end of which is connected to said capacitor.

3. The monostable multivibrator of claim 1 in which the remaining one of said cross-connections comprises a direct connection between an output terminal of said first transistor and an input terminal of said second transistor, and in which there is provided an adjustable source of direct current supply connected to an input terminal of said second transistor whereby the magnitude of the potential of said output pulse is adjustable to a predetermined value which remains constant for all values of output current.

4. The monostable multivibrator of claim 1 in which said input trigger circuit comprises an input capacitor and diode, said input capacitor and said diode being connected in series circuit relation with one end of said circuit being connected to said input terminal of said third transistor, means for applying said switching pulse to the other end of said series circuit for rendering said diode nonconductive and said third transistor conductive, and means for producing a charging current for flow through said input capacitor during the time said diode is nonconductive, said input capacitor upon acquirement of a predetermined charge rendering said diode conductive which reduces current flow through said third transistor to a value which causes it to be rendered nonconductive.

References Cited by the Examiner

UNITED STATES PATENTS

| | | | |
|---|---|---|---|
| 2,840,727 | 6/58 | Guggi. | |
| 2,901,639 | 8/59 | Woll. | |
| 3,020,418 | 2/62 | Emile | 207—88.5 |
| 3,021,435 | 2/62 | Keiper | 307—88.5 |
| 3,033,994 | 5/62 | Fujimoto et al. | |
| 3,108,196 | 10/63 | Colao | 307—88.5 |
| 3,109,105 | 10/63 | Samuel. | |

JOHN W. HUCKERT, *Primary Examiner.*